United States Patent [19]

Jain

[11] Patent Number: 5,629,691

[45] Date of Patent: May 13, 1997

[54] AIRPORT SURFACE MONITORING AND RUNWAY INCURSION WARNING SYSTEM

[75] Inventor: Atul Jain, Los Angeles, Calif.

[73] Assignee: Hughes Electronics, Los Angeles, Calif.

[21] Appl. No.: 451,597

[22] Filed: May 26, 1995

[51] Int. Cl.$^6$ ........................................ G08G 5/04
[52] U.S. Cl. .................. 340/961; 340/933; 342/29; 342/36; 342/59; 364/439; 364/461
[58] Field of Search .............................. 340/961, 933, 340/951, 972, 941, 945; 364/461, 439; 342/26, 36, 29, 50, 59, 30, 31, 32, 455, 456

[56] References Cited

U.S. PATENT DOCUMENTS

| | | | |
|---|---|---|---|
| 3,152,315 | 10/1964 | Rodgers | 340/933 |
| 3,152,327 | 10/1964 | Barker | 342/36 |
| 3,872,474 | 3/1975 | Levine | 342/36 |
| 5,138,321 | 8/1992 | Hammer | 342/36 |
| 5,495,249 | 2/1996 | Chazelle et al. | 342/36 |

Primary Examiner—Jeffery Hofsass
Assistant Examiner—Benjamin C. Lee
Attorney, Agent, or Firm—Leonard A. Alkov; Wanda K. Denson-Low

[57] ABSTRACT

An airport runway incursion warning system for monitoring air and ground traffic at an airport. The system is optimally used with an aircraft that has an electronic tag or interrogation system that stores identification information regarding the aircraft, and an RF transponder for receiving interrogation signals and for transmitting the identification information in response thereto. A radar system comprises a plurality of radar sensor units disposed at predetermined installation sites adjacent to a runway. Each radar sensor unit typically has an interface processor and telemetry electronics for communication, although hard-wired communication paths may be used. An RF/telemetry interface is provided for communicating with the radar sensor units when the interface processor and telemetry electronics are used. The RF/telemetry interface is also used to transmit the interrogation signals to the aircraft and receive the identification information therefrom. A central processing unit is coupled to the radar sensor units for receiving and integrating radar data produced by each the radar sensor units to produce a map of the runway that identifies authorization objects and aircraft that do not constitute intrusion threats, and intruding objects that do constitute intrusion threats to the runway. The central processing unit is optionally coupled to the RF/telemetry interface for transmitting signals to and from the aircraft, and in this case, the central processing unit processes identification information received from the aircraft to integrate the identification information into to generate a displayed image. An operator display is coupled to the central processing unit for displaying the map and identification information generated thereby for use by an operator.

12 Claims, 2 Drawing Sheets

AIRPORT SURFACE MONITORING AND RUNWAY INCURSION WARNING SYSTEM

BACKGROUND

The present invention relates to radar systems, and more particularly, to a radar system that is used to provide surface monitoring and runway incursion for airports.

The prevention of runway incursions has been an issue of increasing concern and has resulted in the development of the Airport Surface Detection Equipment (ASDE-3), the Airport Movement Area System (AMASS), and the Airport Surface Traffic Automation Program (ASTA).

The most relevant prior art relating to the present invention, and airport surface monitoring and runway incursion systems in particular, is the ASDE-3 radar system which is a single high power Ku-Band real aperture radar that is located on a tower adjacent to an airport. The ASDE-3 system experiences shadowing and multiple reflections that seriously affect the its performance, which is a consequence of the fact that it is a single radar system. The ASDE-3 radar system does not have the ability to interrogate vehicles or aircraft monitored by the system. The ASDE-3 radar system is also relatively expensive.

Therefore, it is an objective of the present invention to provide for an improved radar system that may be used to monitor surface and runway incursion at airports, and the like, and which improves upon the currently-used ASDE-3 radar system.

SUMMARY OF THE INVENTION

In order to meet the above and other objectives, the present invention is a runway incursion warning system for monitoring a runway of an airport and for displaying data indicative of unauthorized intrusion onto the runway to an operator. A radar system is provided that comprises a plurality of radar sensor units that are disposed at predetermined installation sites adjacent to selected runways of the airport. Each radar sensor unit associated with a particular runway generates a radar beam that typically overlaps the adjacent radar beam to provide complete coverage of a runway. Each radar sensor unit is coupled to a collocated interlace processor and telemetry electronics that interface between the radar sensor unit and a central processing unit. Communication between each radar sensor unit and the central processing unit may be by physical electrical interconnection and/or RF communication using the telemetry electronics. The physical electrical interconnection may be provided by way of existing cabling normally for runway lights to provide power and the communication link for each of the radar sensor units.

The central processing unit is coupled to an operator display that processed data derived from each of the radar sensor units and displays the data on the operator display. The central processing unit is coupled to an RF/telemetry interlace that is used to communicate with the radar sensor units and to aircraft having an electronic tag or transponder system. The central processing unit also integrates and causes the display of data derived from other systems coupled to it, such as the ARTS, ASDE-3, MODES-S or ACARS systems, for example. The central processing unit also generates a display showing the airport runways along with moving and non-moving physical objects that are in the vicinity of the runway. Such objects include departing and arriving aircraft, buildings, and vehicles that are in the vicinity of the runway. Thus, the present system provides a complete display of the runway environment to an operator.

The system may be used with non-cooperative objects or vehicles, or with aircraft or vehicles that have the electronic tag or RF transponder (transmitter and receiver) system. The electronic tag or RF transponder system contains identification information regarding the aircraft, vehicle, or object. The tag or RF transponder receives interrogation signals and transmits the identification information, and other additional information, if desired, in response to the interrogation signals.

The interface processor and telemetry electronics at each radar sensor unit and the RF/telemetry interface provide a communication link between the radar sensor units and the central processing unit. The RF/telemetry interface transmits the interrogation signals and receives the identification information from the aircraft and other cooperative objects or vehicles. Alternatively, the identification information may be received by a central receiver at the airport while the RF/telemetry interface only transmits interrogation signals in conformance with existing aircraft equipment, such as MODE-S or ACARS systems, for example. Multiple interrogation signals sent by different sensor units are separated and identified on the basis of timing, for example, for reception of identifications signals or GPS position information contained in the identification signals themselves.

The telemetry electronics receives data produced by the radar sensor units and the central processing unit integrates the data derived from the radar sensor units and the electronic tag or transponder system in the aircraft. The central processing unit processes data derived from the radar system and identification information received from the electronic tag to produce a map of the airport that identifies authorization objects and aircraft that are not intrusion threats, and intruding objects that are intrusion threats. The operator display displays the map generated by the central processing unit.

The central processing unit generates warning signals in response to intrusion threats that are detected by the system and wherein the warning signals are transmitted to the aircraft by means of the RF/telemetry interface and the RF transponder system. The central processing unit generates an image of the runways that identifies objects, aircraft that are landing and taking off from the runways, and identifying information associated with interrogated aircraft derived from the electronic tag or transponder system. The central processing unit may also produce data that is displayed on the map that includes priority alert information indicating aircraft that may impose a possible runway incursion, a list of arriving and departing aircraft, and displays that show landing and take-off patterns of arriving and departing aircraft.

The system thus provides for a distributed system of relatively low-cost radars disposed adjacent the runways. Each radar has limited angular coverage and the complete system provides coverage of the entire airport runway area. The present system provides a surface map of aircraft and surface vehicles and point interrogation of aircraft for identification purposes using the electronic tags or transponder systems.

The present runway incursion warning system is considerably less expensive that the ASDE-3 radar system, and does not suffer from the shadowing and multiple reflection problems experienced by the ASDE-3 system. The system is scalable to provide monitoring of different size airports. The system provides high range resolution and velocity information, and may be used to interrogate electronic tags or transponder systems disposed on vehicles and aircraft to provide identification information to aircraft traffic controllers that operate the system. The system provides a real-time display of airport surface traffic and warnings of runway incursion.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
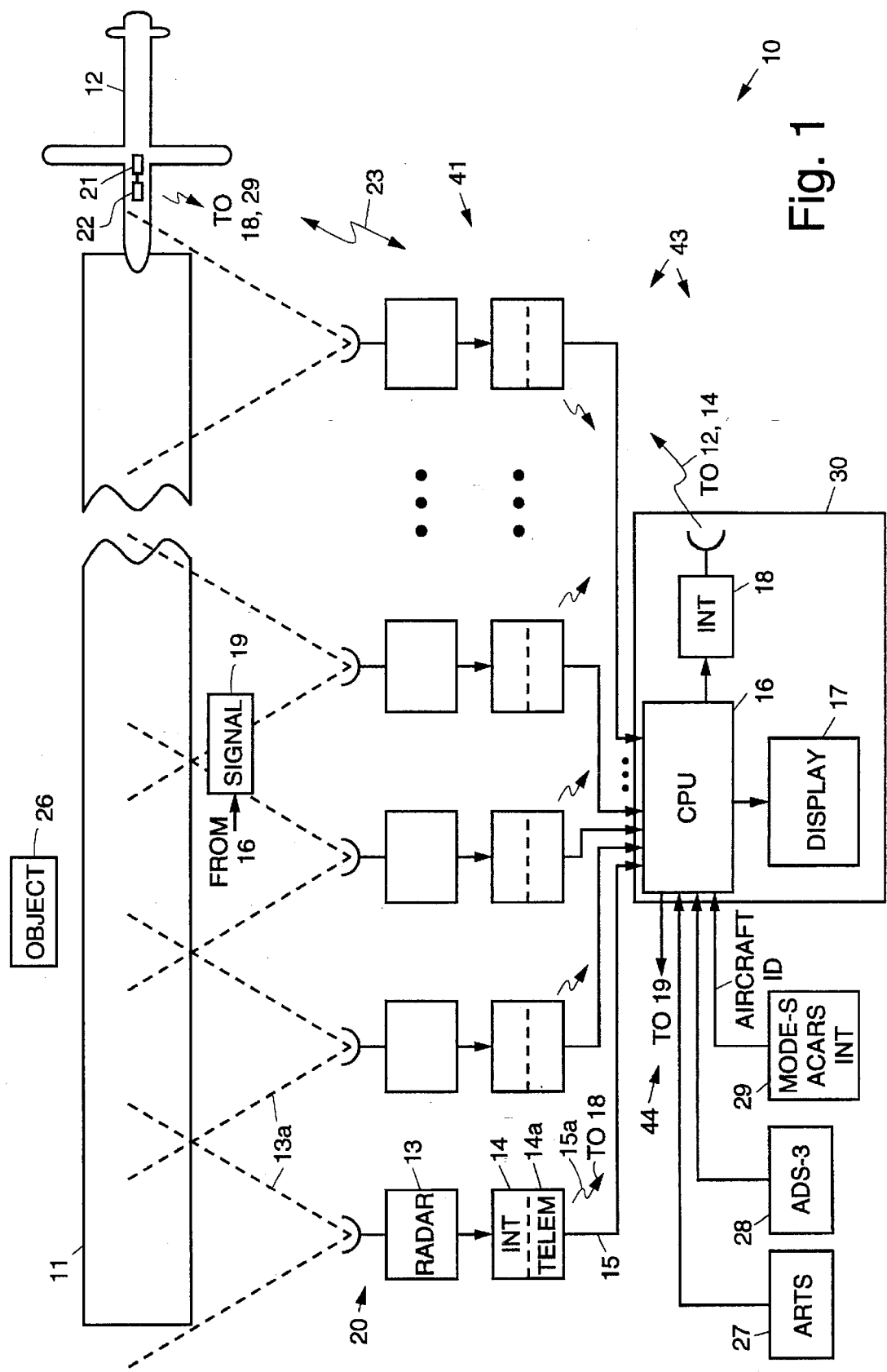
FIG. 1 illustrates a system block diagram of a runway incursion warning system in accordance with the principles of the present invention.

Referring to the drawing figure, FIG. 1 illustrates a system block diagram of a runway incursion warning system 10 in accordance with the principles of the present invention. The system 10 includes a radar system 20 that is comprised of a plurality of radar sensor units 13, such as millimeter wave radar sensor units 13, for example, disposed at predetermined installation sites on the ground adjacent to a runway 11, or runways 11, of an airport. Each radar sensor unit 13 associated with a particular runway 11 generates a radar beam 13a that typically overlaps the adjacent radar beam 13a to provide complete coverage of a runway 11, although this is not absolutely required. Each radar sensor unit 13 is coupled to an interface processor (INT) 14 and telemetry electronics (TELEM) 14a that permit communication with a processing center 30 located in an airport control tower, for example. Intelligent processing may be performed at each installation site in the interface processor 14 to reduce the data rate of telemetered data and perform confidence tests. Existing cabling 15 for airport lights provide power and a communication link for each of the plurality of radar sensor units 13, interface processor 14, and telemetry electronics 14a. Alternatively, a dedicated RF communications link 15a may be employed.

Figure 2:
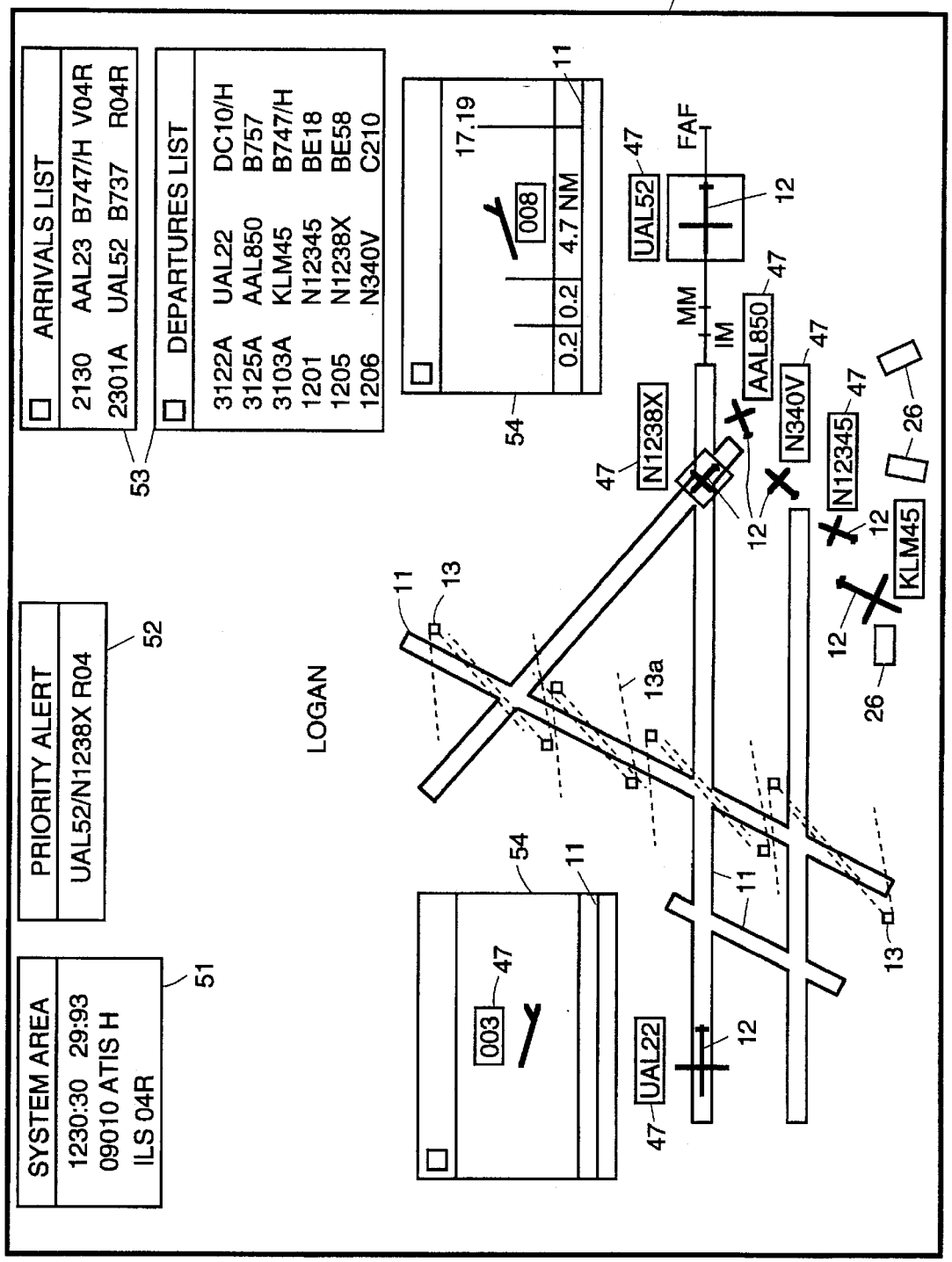
FIG. 2 illustrates a typical video display produced by the runway incursion warning system of FIG. 1.

A central processing unit (CPU) 16 integrates the data received from the plurality of radar sensor units 13, and maintains a map of authorized targets 26, such as fixed objects 26 or buildings 26 that do not constitute intrusion threats. The central processing unit 16 may also collect input data from an ARTS or ASDE-3 system 27 and available identification reports derived therefrom. The ARTS and ASDE-3 systems provide information regarding aircraft approaching the airport. Data that is derived from an ASDE-3 radar 28 if available, may also be integrated by the central processing unit 16, and a dynamic real-time situation display 17 is provided to an aircraft controller, in graphic format, that is clear and easy to interpret. A sample image on the video display 19 that is presented to an operator of the system 10 is shown in FIG. 2.

The aircraft 12 includes an electronic tag or interrogation system 21 such as a MODE-S or ACARS transponder system 21, for example, that provides identification information regarding the aircraft, and an RF transponder system 22. Warning signals may be transmitted to the aircraft 12 by means of the RF/telemetry interface 18 and the RF transponder system 22 over an RF communications link 23. Warning signals may also be displayed to arriving and departing aircraft 12 using ground signals 19 such as lights or beacons disposed adjacent the runway 11. In addition, the electronic tag or interrogation system 21 may be interrogated by the system 10 using the RF/telemetry interface 18 and the RF transponder system 22. Interrogation signals are transmitted to the aircraft 12 by way of the communication link 23, and the electronic tag or interrogation system 21 on the aircraft 12 responds by outputting information stored therein that is returned to the central processing unit 16 by way of the RF communications link 23.

As shown in FIG. 1, the system 10 is comprised of five major subsystems 41–45. The first subsystem 41 comprises the radar system 20 including the plurality of radar sensor units 13 and electronic components installed at each installation site. The second subsystem 42 comprises the interface processor 14 that is coupled to the radar sensor units 13 and that is located at each remote installation site. The third subsystem 43 comprises a telemetry subsystem and includes the telemetry electronics 14a installed at the installation sites and an RF/telemetry interface 18 that is coupled to the central processing unit 16 at the central processor site. The fourth subsystem 44 comprises the central processing unit 16. The fifth subsystem 45 comprises the operator display 17 that includes a conventional display and control terminal. Each of the subsystems 41–45 employed in the present invention are well-known and their interconnection and operation is routine to those skilled in the art.

The operator display 17 used in the runway incursion warning system 10 displays information for use by an airport traffic planner or aircraft traffic controller. The data presented on the operator display 17 optimizes the available data while minimizing the need for physical interaction with the system 10. FIG. 2 illustrates a typical video image displayed on the operator display 17 by the runway incursion warning system 10. Referring to FIG. 2, the display 17 shows an image of the runways 11 of the airport and identifies the locations of buildings 26 and other stationary objects 26, aircraft 12 that are landing and taking off from the runways 11, including data 47 from the transponders 21 from interrogated aircraft 12. Typically the data 47 from each transponder system 21 indicates the aircraft number or flight number, as is indicated by the alphanumeric identifiers in the boxes shown on the display 17. Additional data may be displayed including information provided in a system area 51 that provides data regarding the instrument landing system (ILS) system, the time and other relevant system parameters, priority alert information 51 indicating objects 26 or aircraft 12 that are determined to be runway incursions, a list 53 of arriving and departing aircraft 12, and displays 54 that provide real-time images showing the landing and take-off of arriving and departing aircraft 12.

A preliminary proof-of-concept demonstration model of the present system 10 was constructed and data collection was performed at Los Angeles International Airport (LAX) using a test version of a millimeter-wave radar (radar sensor units 13) developed by the assignee of the present invention. Test results show that the system 10 works as expected and provides superior performance over the ASDE-3 radar system.

Thus there has been described a new and improved radar system for providing surface monitoring and runway incursion for airports. It is to be understood that the above-described embodiments are merely illustrative of some of the many specific embodiments that represent applications of the principles of the present invention. Clearly, numerous and other arrangements can be readily devised by those skilled in the an without departing from the scope of the invention.

What is claimed is:

1. An airport runway incursion warning system for monitoring air and ground traffic in the vicinity of a runway of an airport, said system comprising:

a radar system comprising of a plurality of radar sensor units disposed at predetermined installation sites adjacent to the runway and wherein the plurality of radar sensor units generate substantially overlapping radar beams that illuminate the runway;

a central processing unit coupled to the plurality of radar sensor units, for receiving radar data produced by the plurality of radar sensor units, and for processing the radar data to produce a map of the runway that identify objects and aircraft in the vicinity thereof, wherein each radar sensor unit is coupled to an interface processor for processing radar data generated by the radar sensor unit, wherein each interface processor is coupled to RF telemetry electronics for transmitting the radar data to the central processing unit and wherein the central processing unit is coupled to an RF/telemetry interface for receiving the radar data transmitted from the radar sensor unit by the RF telemetry electronics;

an operator display coupled to the central processing unit for displaying the map of the runway, objects and aircraft generated by the central processing unit; and wherein the aircraft comprises an electronic tag that stores identification information regarding the aircraft, and comprises an RF transponder coupled to the electronic tag for receiving interrogation signals generated by the central processing unit and for transmitting the identification information in response to the interrogation signals;

the interrogation signals generated by the central processing unit are transmitted to the aircraft by way of the RF/telemetry interface, and the identification information is received from the RF transponder by way of the RF/telemetry interface and wherein the central processing unit generates signals for display on the operator display that identifies the aircraft;

and wherein the central processing unit produces data for display that includes priority alert information indicating aircraft that are runway incursions, a list of arriving and departing arriving and departing aircraft, and displays that show landing and take-off patterns of arriving and departing aircraft.

2. The system of claim 1 wherein the central processing unit is coupled to the plurality of radar sensor units by way of a RF communications link for communicating radar data to the central processing unit by way of the RF/telemetry interface.

3. The system of claim 1 which further comprises an ARTS system coupled to the central processing unit, and wherein the central processing unit processes data and identification reports derived from the ARTS system and integrates them into the map that is displayed on the operator display.

4. The system of claim 1 which further comprises an ASDE-3 radar coupled to the central processing unit and wherein the central processing unit integrates data derived from the ASDE-3 radar into the map that is displayed on the operator display.

5. The system of claim 1 wherein the central processing unit generates an image of the runway that identifies objects, aircraft that are landing and taking off from the runway, and identifying information associated with interrogated aircraft derived from the transponder.

6. The system of claim 1 wherein the central processing unit generates warning signals in response to intrusion threats that are detected and wherein the warning signals are transmitted to the aircraft by means of the RF/telemetry interface and the RF transponder.

7. An airport runway incursion warning system for monitoring air and ground traffic in the vicinity of a runway of an airport, said system comprising:

a radar system comprising of a plurality of radar sensor units disposed at predetermined installation sites adjacent to the runway and wherein the plurality of radar sensor units generate substantially overlapping radar beams that illuminate the runway, and wherein each radar sensor unit is coupled to an interface processor for processing radar data, generated by the radar sensor unit, wherein each interface processor is coupled to RF telemetry electronics for transmitting the radar data;

a central processing unit coupled to the plurality of radar sensor units, for receiving radar data produced by the plurality of radar sensor units, and for processing the radar data to produce a map of the runway that identify objects and aircraft in the vicinity thereof, and wherein the central processing unit is coupled to an RF/telemetry interface for receiving the radar data transmitted from the radar sensor unit by the RF telemetry electronics, and the aircraft comprises an electronic tag that stores identification information regarding the aircraft, and comprises an RF transponder coupled to the electronic tag for receiving interrogation signals generated by the central processing unit and for transmitting the identification information in response to the interrogation signals, and an operator display coupled to the central processing unit for displaying the map of the runway, objects and aircraft generated by the central processing unit;

wherein the interrogation signals generated by the central processing unit are transmitted to the aircraft by way of the RF/telemetry interface, and the identification information is received from the RF transponder by way of the RF/telemetry interface and wherein the central processing unit generates signals that identifies the aircraft;

and wherein the central processing unit produces data for display that includes priority alert information indicating aircraft that are runway incursions, a list of arriving and departing aircraft, and displays that show landing and take-off patterns of arriving and departing aircraft.

8. The system of claim 7 wherein the central processing unit is coupled to the plurality of radar sensor units by way of a RF communications link for communicating radar data to the central processing unit by way of the RF/telemetry interface.

9. The system of claim 7 which further comprises an ARTS system coupled to the central processing unit, and wherein the central processing unit processes data and identification reports derived from the ARTS system and integrates them into the map that is displayed on the operator display.

10. The system of claim 7 which further comprises an ASDE-3 radar coupled to the central processing unit and wherein the central processing unit integrates data derived from the ASDE-3 radar into the map that is displayed on the operator display.

11. The system of claim 7 wherein the central processing unit generates an image of the runway that identifies objects. Aircraft that are landing and taking off from the runway, and identifying information associated with interrogated aircraft derived from the transponder.

12. The system of claim 7 wherein the central processing unit generates warning signals in response to intrusion threats that are detected and wherein the warning signals are transmitted to the aircraft by means of the RF/telemetry interface.

* * * * *